US011636469B2

(12) United States Patent
Weber et al.

(10) Patent No.: US 11,636,469 B2
(45) Date of Patent: Apr. 25, 2023

(54) DATA ACCESS MANAGEMENT WITH NON-FUNGIBLE TOKENS

(71) Applicant: DIA Association, Zug (CH)

(72) Inventors: Michael Weber, Potsdam (DE); Samuel Brack, Berlin (DE); Paul Claudius, Berlin (DE)

(73) Assignee: DIA Association, Zug (CH)

( * ) Notice: Subject to any disclaimer, the term of this patent is extended or adjusted under 35 U.S.C. 154(b) by 0 days.

(21) Appl. No.: 17/341,869

(22) Filed: Jun. 8, 2021

(65) Prior Publication Data
US 2022/0391895 A1 Dec. 8, 2022

(51) Int. Cl.
G06Q 20/38 (2012.01)
H04L 9/32 (2006.01)
H04L 9/00 (2022.01)

(52) U.S. Cl.
CPC ..... *G06Q 20/3823* (2013.01); *G06Q 20/3825* (2013.01); *G06Q 20/3827* (2013.01); *H04L 9/3213* (2013.01); *H04L 9/3297* (2013.01); H04L 9/50 (2022.05); H04L 2209/56 (2013.01)

(58) Field of Classification Search
None
See application file for complete search history.

(56) References Cited

U.S. PATENT DOCUMENTS

| 11,308,487 | B1 * | 4/2022 | Foster | G06Q 20/3829 |
| 2019/0130507 | A1 * | 5/2019 | Stollman | H04L 9/0637 |
| 2020/0005284 | A1 * | 1/2020 | Vijayan | H04L 63/08 |
| 2021/0035246 | A1 * | 2/2021 | Schouppe | H04L 9/3239 |
| 2021/0099453 | A1 * | 4/2021 | Cohen | H04W 12/00 |
| 2021/0119764 | A1 * | 4/2021 | Meghji | H04L 63/0407 |
| 2021/0182423 | A1 * | 6/2021 | Padmanabhan | G06F 21/6245 |
| 2021/0326844 | A1 * | 10/2021 | Zhou | G06Q 20/36 |
| 2021/0333995 | A1 * | 10/2021 | Grossman | G06N 5/025 |

OTHER PUBLICATIONS

"Patrick Collins, How to Make an NFT and Render it on the OpenSea MarketPlace, https://www.freecodecamp.org/news/how-to-make-an-nft-and-render-on-opensea-marketplace, Apr. 1, 2021." (Year: 2021).*
"ERC-20 Token Standard", Ethereum, 2021, pp. 1-6, retrieved from https://ethereum.org/en/developers/docs/standards/tokens/erc-20/.
"ERC-721 Non-Fungible Token Standard", Ethereum, 2021, pp. 1-6, retrieved from https://ethereum.org/en/developers/docs/standards/tokens/erc-721/.
"EIP-20: Token Standard", Ethereum, 2015, pp. 1-4, retrieved from https://eips.ethereum.org/EIPS/eip-20.
"EIP-721: Non-Fungible Token Standard", Ethereum, 2018, pp. 1-14, retrieved from https://eips.ethereum.org/EIPS/eip-721.

* cited by examiner

Primary Examiner — Kito R Robinson
Assistant Examiner — Toan Duc Bui
(74) Attorney, Agent, or Firm — The Webb Law Firm

(57) ABSTRACT

The present disclosure relates to data access management and the relates data access management system, user devices for data users and data sources, as well as to the corresponding methods. In some embodiments, a non-fungible token (NFT) registry is provided as a part of the data access management system, storing on a blockchain: source NFTs, each source NFT (sNFT) being uniquely associated with a data source; and data NFTs, each data NFT (dNFT) being attributed to one sNFT and granting access to the associated data source. The data sources may mint or request minting of the sNFT and the data users may mint dNFTs.

11 Claims, 9 Drawing Sheets

DATA ACCESS MANAGEMENT WITH NON-FUNGIBLE TOKENS

TECHNICAL FIELD

The present invention relates generally to data access management platform for managing generation of a hierarchy of verifiable non-fungible tokes based on blockchain.

BACKGROUND

A blockchain is a distributed and decentralized network that may serve for various purposes. It is an immutable ledger technology where the recorded information is permanent, open, and, in case of open blockchain platforms, be viewed by everyone. No central authority is necessary to monitor the transactions of the network, which makes it robust against attacks.

A typical blockchain is a growing list or tree of records, referred to as blocks that are linked (chained) using cryptography. Each block typically contains a cryptographic hash of the previous block, a timestamp, and transaction data. Structuring a blockchain as a hash tree provides for an efficient and secure verification of the content. Transactions, which are recorded in a blockchain, cannot be changed retroactively without the alteration of all subsequent blocks. The term transaction is usually used to refer to any exchange of assets or data between peers. For example, a transaction may be transfer of tokens from one account to another account. Accounts may be externally owned accounts or blockchain intern accounts such as an account of a contract or other extern accounts. An account may be identified by a cryptographic key to which tokens may be transferred and which stores a value of the account balance.

Many blockchains are publicly accessible or private. Public and private blockchains may be permissioned or permissionless. In a permissionless blockchain, any computing system can run a node, participate in transaction validation, and/or provide smart contracts. A node is a computer system, which holds a copy of the blockchain. The nodes are connected with each other via a network such as Internet or Intranet. On the other hand, there are permissioned blockchains, which are computing system with predefined participants (nodes) that need a permission to validate and record transactions on the blockchain. Only computer systems that are previously admitted can run the nodes that validate transaction blocks and/or execute smart contracts on the blockchain or the like. Two exemplary well-known public and permissionless blockchain platforms are Bitcoin and Ethereum. An example of Ethereum compatible platform for building a private, permissioned blockchain is Matic (Polygon) or Bionic; Ethereum also provide a possibility of a private deployment. Blockchain architectures typically further include further features such as rules for interactions. In these architectures, network participants may be rewarded for their contributions through issuance of cryptographic tokens, which are often referred to as crypto coins or cryptocurrency.

In particular, the term "mining" refers to writing transactions to the blockchain, which is typically connected with a reward. Writing the transactions includes validating information, creating a new block, and recording it into the blockchain. Miners (miner nodes) may compete for the opportunity to write the transactions by solving a challenge. The first miner to solve the challenge may write the transaction. The miners are typically nodes that maintain their own copy of the blockchain and update it regularly. The transactions are typically collected from a transaction pool into a block and the miner produces a hash for the new block. In addition, the block is also added a hash of the preceding block (parent block), the transaction data and a timestamp. The other miners verify the block and may also gain a corresponding reward for it. This process is also referred to as a proof of work. The reward for solving the challenge corresponds to issuing tokens that correspond to a currency of the bitcoin network. Thus, it is also referred to as minting. However, the minting generally does not require the proof of work procedure as described above. For example, alternative procedures such as proof of stake (stacking instead of mining) or proof of authority may be used instead, for writing the transactions into the blockchain and thereby generating the tokens.

The term "smart contract" is often used to refer to software programs that run on a blockchain. A smart contract practically enforces a set of rules using a cryptographic code. A smart contract is effectively a piece of code that resides inside the blockchain on a specific address (contract account). The written code is publicly visible in the blockchain, and transparent to anyone who is connected to the network. Upon fulfilling some conditions by some desired time, the contract may be triggered to execute a digital transaction. Since the conditions are encrypted on the blockchain and transparent, no party is able to alter the contents of a contract.

Smart contracts can be seen as a type of an account identified by a public key. They have a balance and they can send transactions over the network. However, they are not controlled by a user, but rather deployed to the network and run as programmed. User accounts can then interact with a smart contract by submitting transactions that execute a function defined on the smart contract. Smart contracts can define rules, like a regular contract, and automatically enforce them via the code. Being open-source, the contract code enables the involved parties to determine what the contract does and how it is to be initiated. Smart contracts are often developed in a high-level programming environment that can be compiled and deployed to a blockchain for execution by computer systems using a virtual machine on the blockchain, e.g. as provided by Ethereum. Once a smart contract is written to a blockchain, the code of the smart contract acts as a programmatically defined autonomous agent with its own persistent variables (and often key/value store) that executes by computer systems within the blockchain when the smart contract is referenced by a message and/or transaction.

Recording the contract to the blockchain may be performed for instance by mining or minting as mentioned above. The execution of the contract may release a payment to an appropriate party, which can later be verified and recorded by anyone in a permissionless system. In order to ensure that all of the information required to verify the transactions on the blockchain are contained in the blockchain, external data that may be used by the smart contract may need to be input into the blockchain. A blockchain oracle is any computer system or entity that connects a blockchain with off-chain data. These oracles enter every data input through an external transaction. For performing transactions on blockchain, having reliable data may be desirable.

SUMMARY

Embodiments of the present application provide platform for data access management according to the independent claims, user devices that may source and/or access the data, and the corresponding methods.

The foregoing and other objects are achieved by the subject matter of the independent claims. Further implementation forms are apparent from the dependent claims, the description and the figures.

According to a first aspect, the present disclosure relates to a data access management system. The data access management system comprises a computer system comprising a plurality of computer devices connected to a network, wherein the computer system includes a non-fungible token (NFT) registry. The NFT registry stores on a blockchain (i) source NFTs, each source NFT (sNFT) being uniquely associated with a data source; and (ii) data NFTs, each data NFT (dNFT) being attributed to one sNFT and granting access to the associated data source. At least one of the computer devices is configured as an sNFT registry service capable of: verifying a data source, minting an sNFT in association with the authenticated data source, and registering the minted sNFT to the blockchain. At least one of the computer devices is configured as a dNFT registry service capable of: (a) receiving a request for dNFT from a data user for an access right to the data source; (b) minting a dNFT for the requested access right and (c) registering the minted dNFT as attributed to the sNFT which is associated with said source data and with said data user to the blockchain.

For example, in the data access management system each sNFT is capable of being attributed one or more dNFTs and includes access terms for the source data. For example, each dNFT is capable of being attributed to a single one sNFT.

In some exemplary implementations, said data source is based on one or more other data sources and said sNFT is a meta sNFT associated with one or more parent sNFTs that are respectively associated with said one or more other data sources.

In some exemplary implementations, at least one of the computer devices is configured as a data access service capable of: receiving a request for the source data and the dNFT attributed to the sNFT which is associated with said source data; verifying authenticity of the dNFT, checking whether the access right specified by the dNFT is applicable to access the data source; and permitting an access to the data source if the checking was affirmative and denying the access to the data source if the checking was negative.

For example, data of said data source is stored on the blockchain and the data access service is a pre-programed contract.

In some exemplary implementations, the dNFT registry service is further capable of minting said dNFT for a requested access right upon fulfilling a pre-configured condition including at least one of: transfer of an amount of a crypto-currency to an sNFT pool including the sNFT to which the dNFT is attributed and/or one or more parent sNFT of said sNFT; transfer of an amount of a crypto-currency to a pool of dNFTs attributed to said sNFT; and burning an amount of a crypto-currency.

In such implementations, for example, each dNFT is associated with a rank that influences determination of an amount of crypto-currency pertaining to said dNFT from said dNFT pool. Moreover, for example, the rank is determined in a pseudo-random manner for at least a subset of firstly minted dNFTs among all minted dNFTs.

According to another aspect, a user device is provided. The user device comprises a processor; a network interface; and a memory containing an application. The processor is capable of being configured by the application to: store one or more non-fungible token (NFT) for data (dNFT), wherein the one or more dNFT is registered on a blockchain, attributed to one source NFT (sNFT), and granting access to a data source, wherein the sNFT is uniquely associated with the data source; and generate a request for access to data from said data source and transmitting the request accompanied with the dNFT over the network interface.

For example, each sNFT is capable of being attributed one or more dNFTs and includes access terms for the source data; and each dNFT is capable of being attributed to a single one sNFT.

According to another aspect, a data access management method is provided. The method comprises the following steps: (1) generating a source Non-Fungible Token (sNFT), the generating including: verifying a data source, minting an sNFT in association with the authenticated data source, and registering the minted sNFT to the blockchain; and (2) generating a data Non-Fungible Token (dNFT) the generating including: receiving a request for dNFT from a data user for an access right to the data source; minting a dNFT for the requested access right; and registering the minted dNFT as attributed to the sNFT which is associated with said source data and with said data user to the blockchain. Said sNFT is one of a plurality of sNFTs registered on the blockchain and each sNFT is uniquely associated with a data source. Said dNFT is one of a plurality of dNFTs registered in the blockchain and each dNFT is attributed to one sNFT and capable of granting access to the associated data source.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which.

Like reference numbers and symbols in the various figures indicate like elements, in accordance with certain example implementations.

DETAILED DESCRIPTION OF EXEMPLARY EMBODIMENTS

Figure 2:
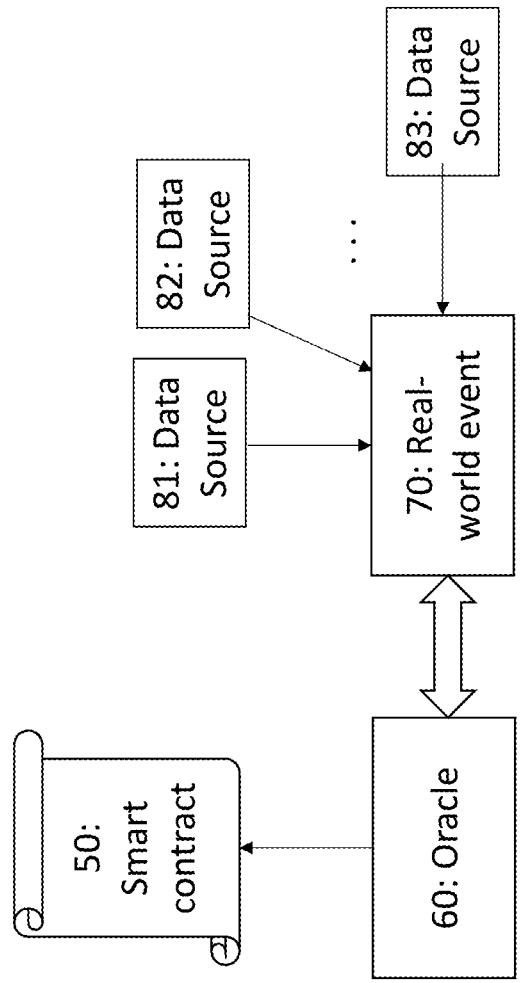
FIG. 2 is a block diagram illustrating provision of data from various blockchain external data sources to a smart contract.

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with described methods may also hold true for a corresponding devices or systems configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

For many blockchain applications, reliable delivery of accurate data is of essence. It may be desirable to manage and track rights for the usage of data by the originators. It may be desirable to track authenticity of data by the users. It may be desirable to provide a platform that enables data access management capable of managing and tracking data access for originators (data sources) and users.

One non-limiting example application that may benefit from an efficient data access management is data rights management (DRM), e.g. in context of a decentralized finance ecosystem (DeFi) on Ethereum. The current infrastructure for data provision in the DeFi ecosystem has organically grown around the need for data by smart contracts (dApps on Ethereum). A desirable building block may be to provide a computer system and method with the ability to track and audit which data is used by whom, from which sources, under which licenses. Without such building block, the development of standards and best practices around the automated usage of data are limited and users of the data may operate with unknown risks. On the other hand, the usage of data feeds under commercial licenses currently requires centralized management and monetization infrastructure, which stands in contrast to the desired and computerized decentralization.

Figure 1:
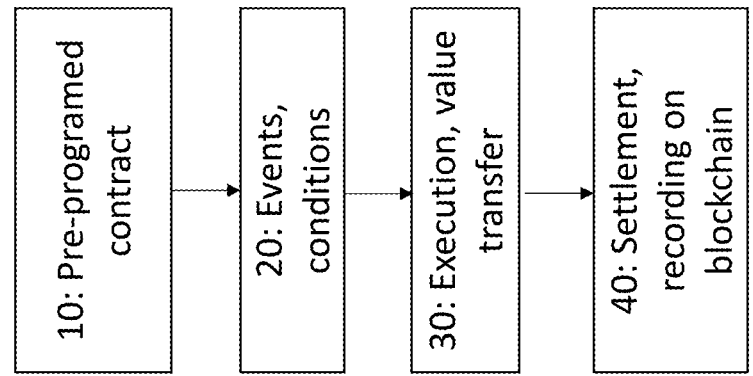
FIG. 1 is a flow diagram showing an example of executing a smart contract.

FIG. 1 illustrates a general method for executing a smart contract. For example, parties reach an agreement which is deployed on a blockchain in step 10. For example, the blockchain may be Ethereum, the code may be programed in Solidity language. For example, in Ethereum, smart contracts may be executed in the environment called Ethereum Virtual Machine (EVM). The code may thus be compiled to bytecode for the EVM to process. Then, the contract may be executed upon occurrence of a certain event and under some conditions 20 defined by the contract. The execution may be connected with transfer of value, such as transfer of some tokens or rights or data or the like in step 30. For execution of the contract, the user may be charged. After the transactions (i.e., operations) of the contract are finalized, EVM will generate a hash value of the state and record it into the blockchain in step 40. Writing into the blockchain may again be charged for, as described above, e.g. by minting a currency token which may be in an exemplary implementation a fungible token.

Ethereum currently includes two standard token protocols (also referred to sometimes as templates) of smart contracts, namely the ERC-20 token standard and the ERC-721 non-fungible token standard. These token protocols define the standard variables, functions, and interfaces in the smart contract. With the protocols, users can issue tokens based on smart contracts running on top of Ethereum. For example, a user can publish an ERC-20 contract on Ethereum issuing tokens to others. After that, any other users (even contracts) can receive or send the token without a centralized authority (e.g., stock exchange).

ERC-721 provides a mapping of unique identifiers (each of which represents a single asset) to addresses (accounts), which represent the owner of that identifier. ERC-721 also provides a permissioned way to transfer these assets, using a transferFrom method. These two methods are basics to represent an NFT: a way to check who owns what and a way of transferring assets. It is noted that, although the ERC-721 standard is used as an example here, this concept of NFTs is also valid for other blockchains. Besides these essential pieces of information, NFTs may comprise metadata reflecting the actual asset represented by the NFT. These metadata may be stored on-chain or, if the data amount is large, off-chain with, for instance, a link to the off-chain data. It is also conceivable to store smaller pieces of information on-chain and larger pieces off-chain.

To mint an NFT on a blockchain, it may be requested to define at least the above mentioned owner identifier and the permissioned way to transfer the assets and submit it to the blockchain. These may be inputs to a smart contract in step 30. As mentioned above, blockchain-extern input data may be provided to the blockchain over an oracle. This is illustrated in FIG. 2. In particular, a smart contract 50 may use data from one or more data sources such as different data sources 81, 82, 83, and possibly further data sources. These may be collected and provided upon a real world event or condition 70 to the oracle 60, which provides them to the smart contract. The real world event may be e.g. an expiry of a timer for regular data provision or an event of updating certain data or the like.

In the following, some functional description is provided for explaining an exemplary implementation of data access management of the present disclosure. According to some embodiments, NFTs, which are also referred to as Autonomous Rights Tokens (ART) herein, are provided to be used to track and manage data usage rights. The ARTs are NFTs that hold data access terms and/or rights information (license information) of a certain data set and may act as a key for some smart contracts to be able to receive the certain data set. In this way, license rights are tokenized into an NFT token (ART) that embeds the terms and conditions of the license as a machine-readable contract which may be used to control the data access. Provision of such NFTs enables, for instance, embedded whitelisting of license holders for the purpose of data access. Moreover, an immutable and smart-contract enabled renewal, cancellation and amendment of data access terms and/or rights information may be possible. The immutable license text and rights may be embedded in the NFT tokens and thus on the blockchain.

Figure 3:
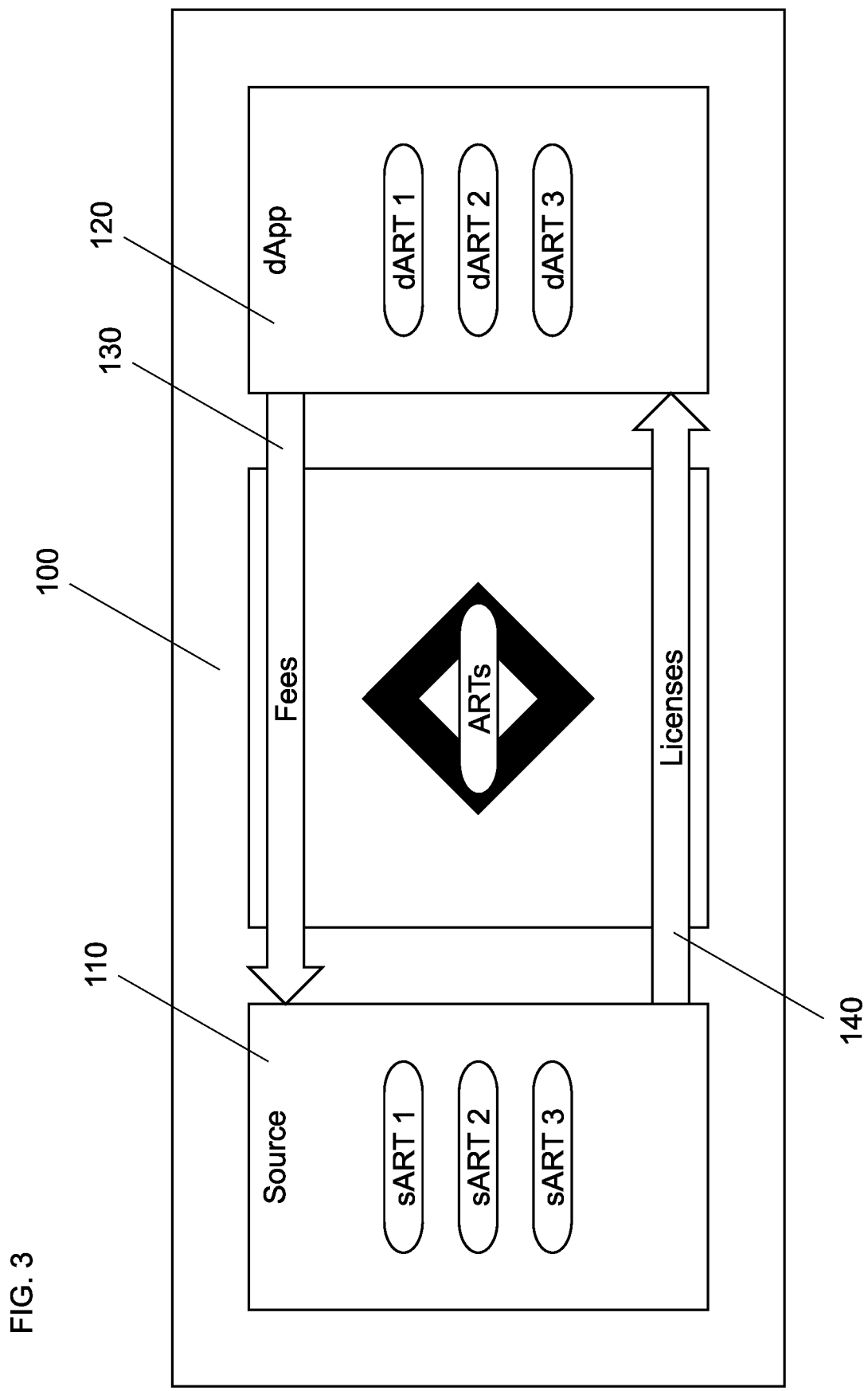
FIG. 3 is a block diagram illustrating an exemplary functional infrastructure of a system for data access management using two kinds of non-fungible tokens.

FIG. 3 is a schematic drawing of an exemplary system 100 for managing data access rights between some data sources 110 and some data users 120. In this example, the data users may be smart contracts such as dApps. However, the present disclosure is not limited to such example and in general, the data users may be other programs or even humans or companies or the like. While the data sources 110 provide licenses (rights) 140 for using source data to the data users 120, the data users 120 may provide some fees 130 (such as currency tokens) to the data sources 110. However, it is noted that provision of fees is not mandatory or limiting and that the data may be provided unconditionally or upon other conditions. The fees may be paid in an extern and/or intern crypto-currency of the data access management platform.

Figure 4:
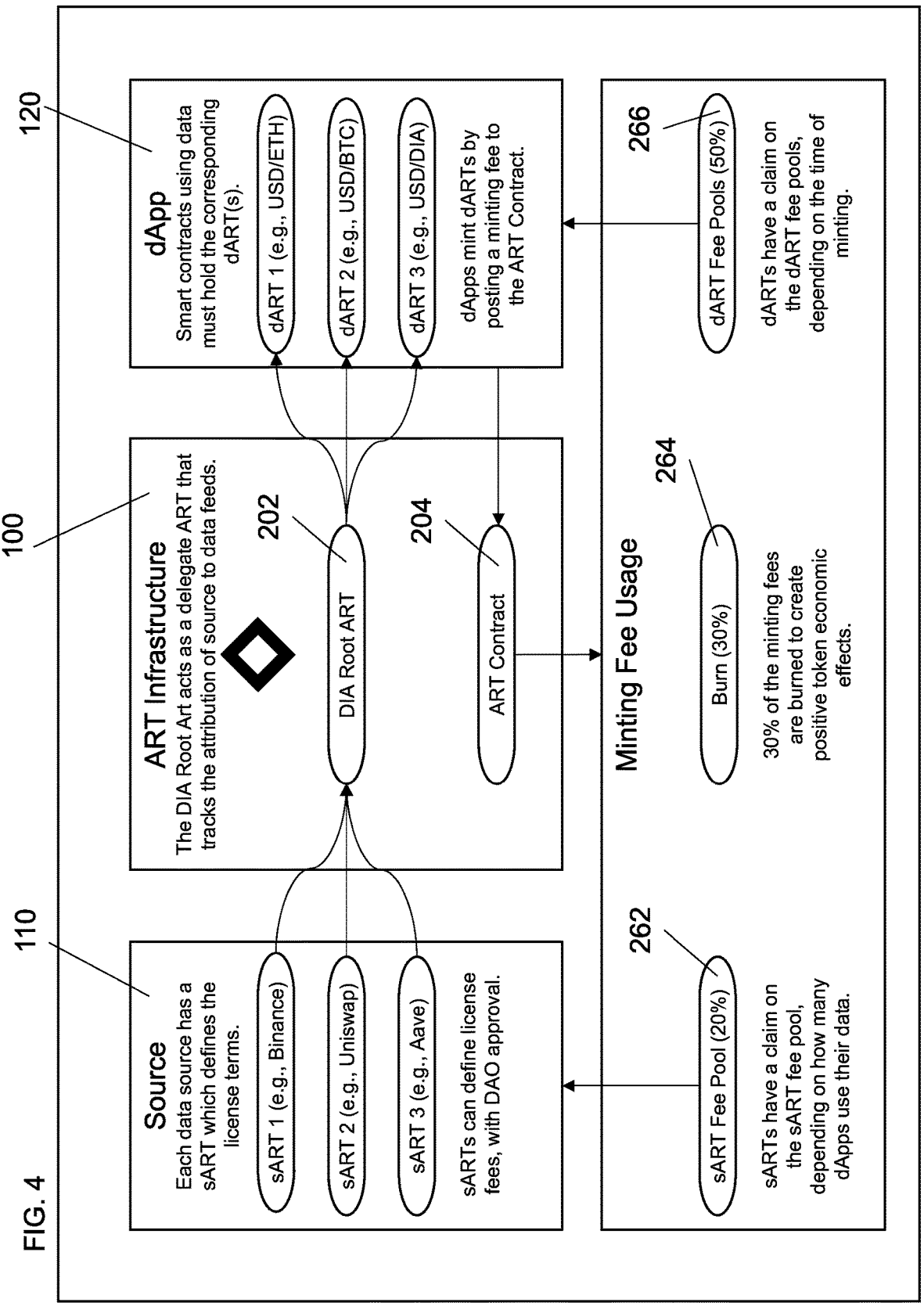
FIG. 4 is a block diagram illustrating an exemplary functional infrastructure of a system for data access management using two kinds of non-fungible tokens allowing for attributing rewards to primary sources when providing access to secondary sources.

FIG. 4 is a schematic drawing illustrating an exemplary functional infrastructure for generating ARTs in more detail. ARTs that are used by dApps as key to access a dataset are also referred to as dARTs in this example. They are non-fungible tokens for data access (dNFTs). A dART represents the right to use a dataset under certain condition or conditions (i.e. type of usage, time period for allowed usage, and/or other limitations or specification of use). dARTs can be minted within the system 100 by defining the desired dataset, data user identification, and, possibly, by providing a minting fee to a dART fee pool. The generation of dARTs can be integrated through smart contract interactions into web3 applications or into another kind of applications (e.g. local user device applications). In other words, a dART can be minted by using an underlying smart contract for minting and recorded to the blockchain. In some embodiments, the blockchain is a public blockchain such as Mainnnet Ethereum. However, the present disclosure is not limited to usage of Ethereum or generally to usage of a public blockchain. Some private blockchain implementations may also be used. FIG. 4 shows an example in which the data user is a dApp. Smarts contract (such as sApps) using the data subset may be required to hold the respective dART for a data subset to be able to use it. The access may be automatically checked by the oracle or before providing the data to the oracle at the data source side or by any other means, possibly depending on the location of the accessed data. A dApp may mint a dART by interacting with an ART contract 204 in the system 100 including the blockchain. In the example of FIG. 4, the ART contract interaction includes posting of a minting fee to the ART contract 204. Exemplary and non limiting usage of the fee may be implemented as shown in FIG. 4: a first portion of the minting fee is burned 264. Burning a fee is a term standing for removing the first portion of the fee from the system, e.g. by deleting the corresponding amount in a crypto-currency. A second portion of the minting fee is assigned to a dART 266 pool and a third portion is assigned to an sART pool 262. It is noted that owners of dARTs may be allowed or disallowed to issue child dARTs based on the parent dART. The allowance or prohibition of such sublicensing of data access may be given by system design, so that it is generally allowed or prohibited for all data users. Alternatively, it is conceivable to allow or to prohibit sublicensing by the terms embedded in the associated sART or in the dART. Implementation using a public blockchain for registering dARTs may facilitate transferring or re-assigning dARTs by anyone.

An sART is a non-fungible token sNFT which represents a data source 110 and the usage rights associated with a particular data set provided by that source. Each sART is unique and each data set only has one sART. In other words, the sART is unique for the data source or data set and defines the access terms for the data source or data set. A data source may be a source, which provides a data set that may be regularly updated such as an exchange course for currencies that may be useful for some DeFi dApps or weather in certain places or results of technical measurements obtained by some sensors or media content or the like. Then an sNFT may be associated with a data source. However, the present disclosure is not limited to such notion of data source: a data source may produce also various different data sets (such as art works or media works or technical data or program codes or the like) for which different respective NFTs are provided.

The access terms (license terms) may define access fees (license fees) for accessing the data. The fee structure may be differentiated (for different types of access or time periods of access or other conditions of access) and include further fees such as fees for allowing further sublicensing or the like. The access terms may further define allowed types of access or any limitations or conditions of the access. The above mentioned examples of access terms are only exemplary and, in general, any proprietary and/or open-source terms may be embedded into the sART, e.g. to make it suitable for a particular data access application. According to an embodiment, any dART attributed to an sART will provide access rights which are compliant with the sART terms. The dART terms may define particular access rights that are same or more limiting in comparison with the terms of those of the sART.

An sART may be linked to one or more dARTs, defining the usage rights of the respective data license. Different dARTs linked with the same sART may define the same usage rights or mutually different usage rights (e.g. differing in usage time and/or usage type such as commercial, private, or the like). sART may be eligible to claim fees generated through the minting of the one or more linked dART. In the example of FIG. 4, the data subsets on which dARTs provide license may be, e.g. currency rates of two currencies such as USD/ETH (US dollar to Ether) as shown in dART 1, USD/BTC (US dollar to Bitcoin) as shown in ART 2, or USD/DIA (US dollar to DIA currency) as shown in ART 3. The corresponding data sources 110 to which the data are attributed are sART 1 (e.g. Binance, which is a trading platform for crypto-currencies), sART 2 (e.g. Uniswap, which is a platform for token exchange), and sART 3 (e.g. Aave, a platform for lending/borrowing). However, the present disclosure is not limited to use cases related to DeFi. The data sources may be generating media or program code or any other asset such as control data for controlling, configuring, or training machines.

In FIG. 4, the system 100 further features a Root ART 202, which acts as a delegate ART and tracks attributions between a data source and the data feeds (i.e. attributions between the sARTs and dARTs). In other words, the Root ART 202 in this example is an sART, which provides access to a data source that combines data from a plurality of other sources. Such a meta sNFT may provide an advantage of enabling tracking contributions from different primary sources to some new data sources and e.g. correspondingly provide rewards transparently. The Root ART 202 (or in general a meta sNFT) stores a reference to its parent sARTs, in this case sART 1, sART 2, and sART 3.

Figure 5:
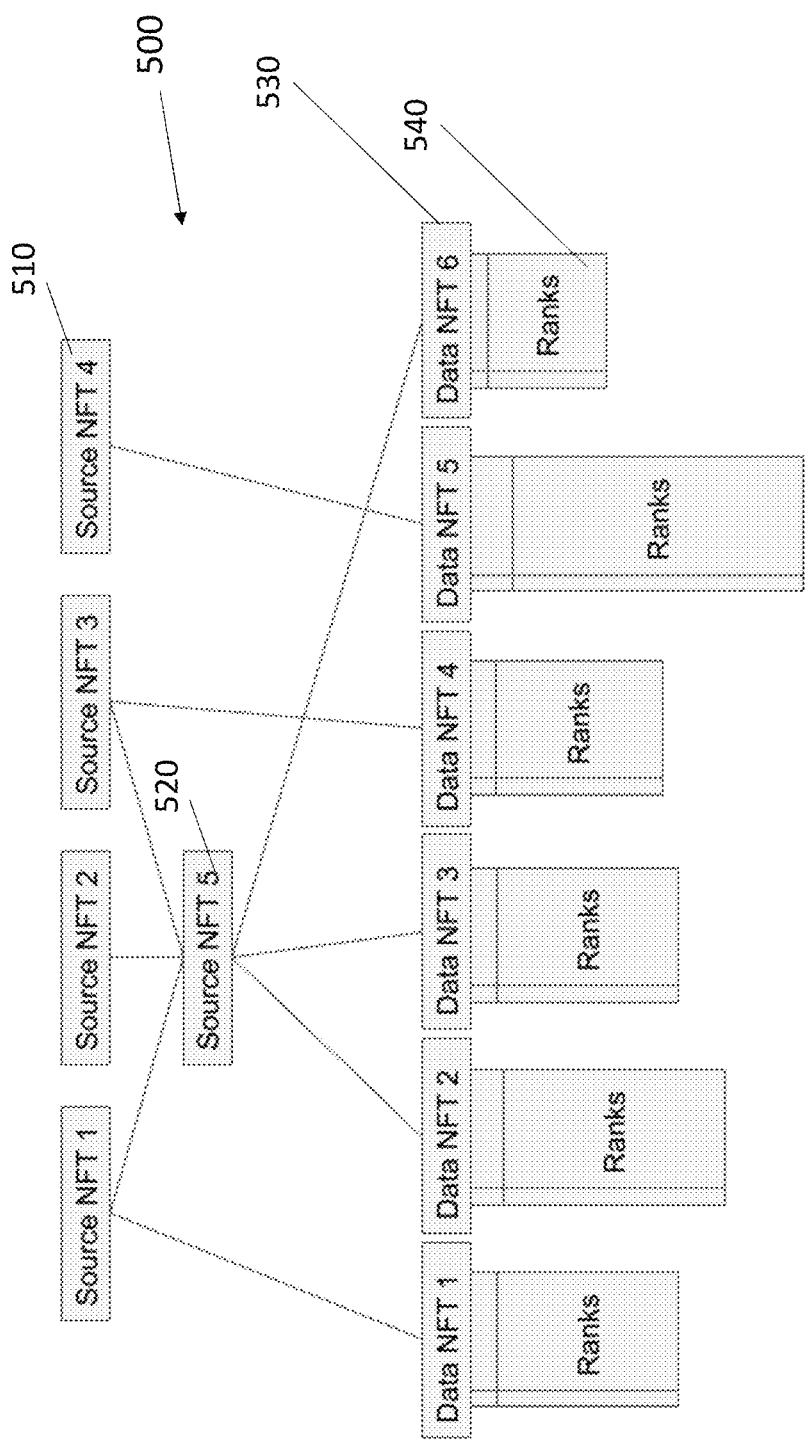
FIG. 5 is a is a schematic drawing illustrating an exemplary token hierarchy for the non-fungible tokens related to data sources and non-fungible tokens related to data users or uses.

FIG. 5 illustrates an NFT hierarchy 500 an example of which is the above mentioned ART hierarchy. Source NFTs can have a parent-child relationship, whereat one sNFT may one or multiple parents. For example, primary sNFTs 510 include sNFT 1, sNFT 2, sNFT 3, and sNFT 4. These primary sNFTs 510 are all parents to a secondary (meta) sNFT 520 referred to as sNFT 5 in FIG. 5. Data NFTs (dNFTs) 530 each belong to exactly one sNFT. If data are referencing multiple sources 510, the new meta sNFT 520 is created, like Source NFT 5 in this example. Each sNFT 530 can have a varying number of minted tokens in different ranks. An sNFTs 510, 520 can be a parent of several data NFTs 530.

In FIG. 5, dARTs are associated with various ranks 540. It is noted that the concept of ranks exemplified herein is not necessary in general. It may be implemented in order to incentivize using of new data. A rank may be randomly assigned to a dART at the time of minting it. However, the rank does not have to be random and may follow some predefined strategy or algorithm. There may be a preconfigured number R of ranks such as three, four, five or any other number. For example, a number M of first minted data tokens attributed to the same sART are assigned a random rank among the first R−1 ranks. The following minted data tokens are all assigned the R-th rank. Other rank assignments are possible, depending on the kind of incentivization desired for a particular application. All data tokens (dARTs) are eligible to claim a portion of the collected fees that are held in a fee pool; wherein higher ranks (the first ranks) of data tokens may be eligible for a higher percentage of the fee pool than lower ranks. This strategy causes higher ranks to be more valuable, in conjunction with it being more difficult to obtain.

Figure 6:
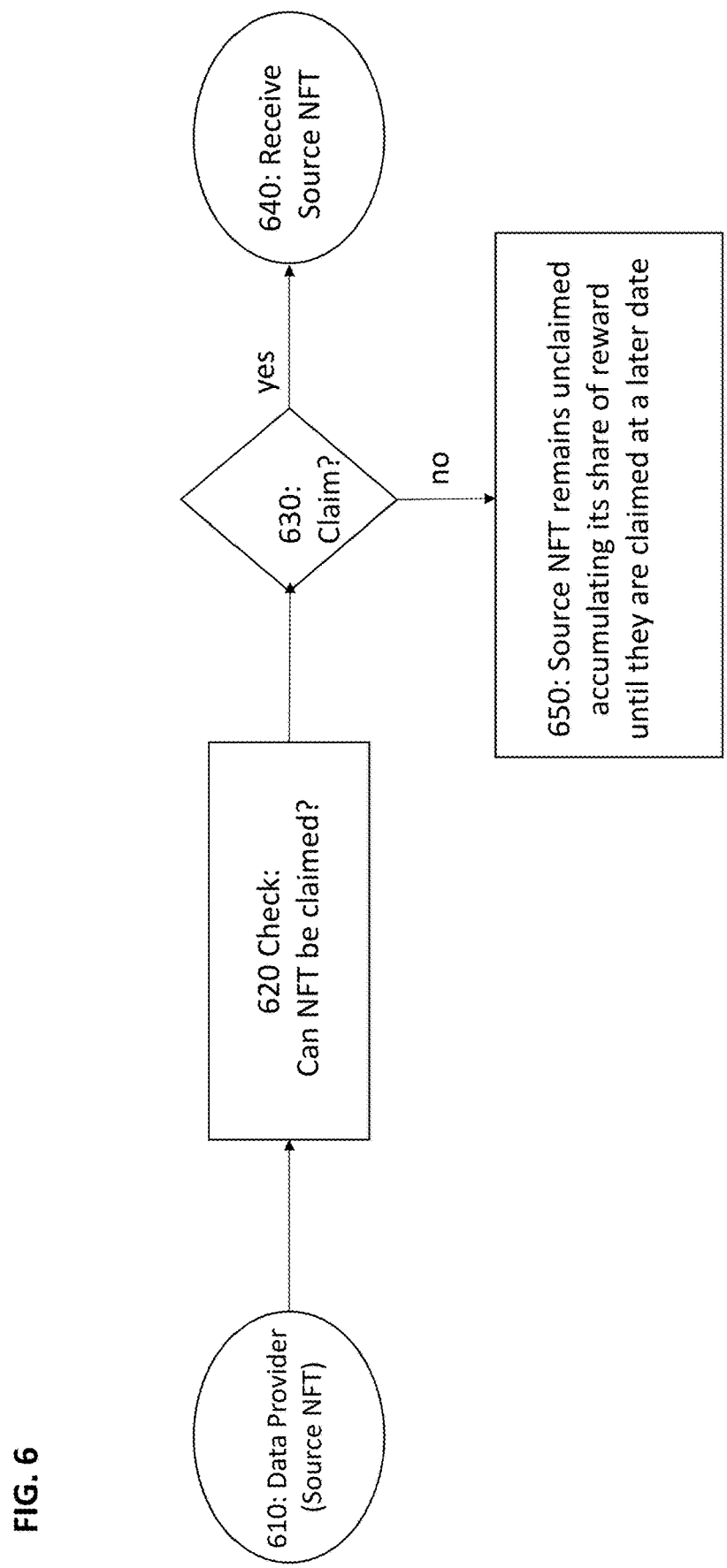
FIG. 6 is a flow diagram illustrating requesting of sNFTs from some authority in an initial phase, by new data sources.

It is noted that starting of operation of the system for data access management described above with reference to FIGS. 3 to 5 may include an initial phase referred to as Genesis. The initial phase may be limited to minting of N first tokens (e.g. 1000 or 1500 or the like). In the initial phase, the data access management system may require an additional authentication or verification of data sources. In some embodiments, new data sources may be prohibited from directly minting sNFTs. They may be required to request issuance of sNFT from a community running the data access management system or from some other predefined authority. This is illustrated in FIG. 6. In particular, a data provider 610 checks whether an sNFT may be issued in step 620. This may be performed by checking whether data issued by the data provider 610 are used by someone or some contract. If the data provider 610 has a claim on an sNFT and claims it ("yes" in step 630), then the above-mentioned authority mints and assigns 640 the sNFT to the data provider 610. The sNFT may have some pre-set or default access terms. If the data provider 610 has a claim but does not claim it, the sNFT remains unclaimed 650, accumulating its share of reward until they are possibly claimed at a later date. Mining of dNFTs does not have to be restricted in this example and may be permissonless. Moreover, it is conceivable to authorize a data provider 610 after some time (e.g. after the initial phase or at another time point before the initial phase or after the initial phase) to mint sNFTs directly (e.g. by interacting with the corresponding contract). The authorization may be issued by the above-mentioned predefined authority. Thus such system may be seen as permissioned. After the authorization, the data provider 610 may populate the attributes of such sNFTs themselves and/or change the attributes.

The above-described system for data access management may provide several advantages. For instance, NFTs may host individual data licenses (access conditions) including all relevant parameters required to define the license agreement, like duration, usage context or the like. This enables for automated and still individualizable data access management. The NFTs may allow the licenses to be directly held by and associated with smart contracts, which are using the data and making them a prerequisite for the usage of the data. NFTs may be minted in a decentralized manner, opening licensing to anyone and removing the need for centralized administration. NFTs may be traded on any secondary market that enables trading financial primitives for data rights and the creation of incentive systems to create datasets. In general, some embodiments may enable automated distribution, tracking and enforcement of license conditions according to specific and configurable terms.

Figure 7:
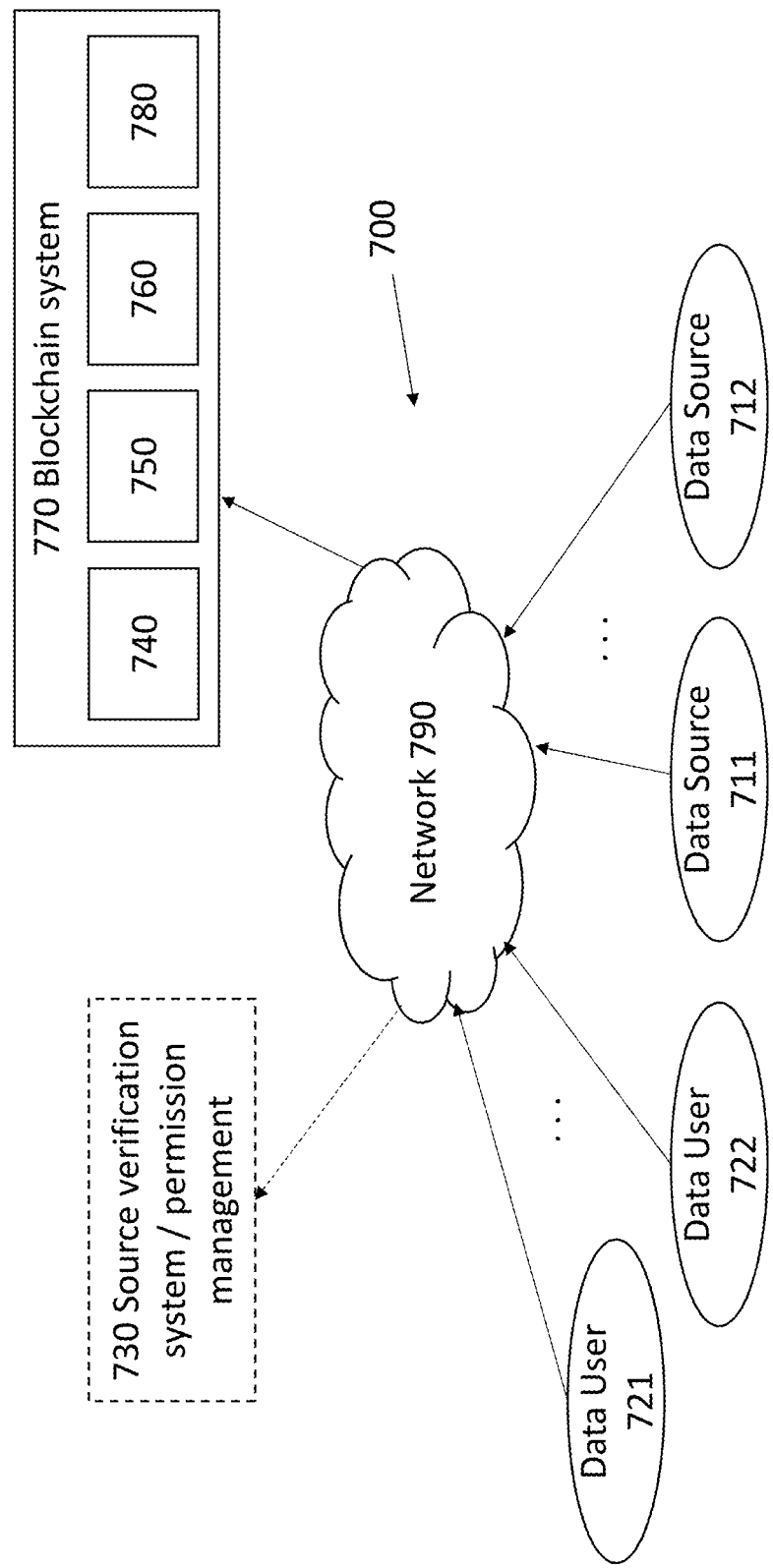
FIG. 7 is a block diagram illustrating an exemplary platform including a system for data access management.

The dNFTs serve as a token-based alternative for traditional API keys, which are used to grant access to, and track usage of specific data endpoints. This works by having the data provider check, e.g. to make sure a wallet (account) requesting data is holding the appropriate dNFT to access the requested data. Additionally, having data tokens may grant holders of it a claim to a percentage of the fee pool associated with that data set; a portion of the fees accrued by accessing that data set may be claimable by the data token holder, incentivizing users to generate and hold these tokens to earn fees. Source token holders are data owners; either those who generate and produce that data, or rebroadcast that data on behalf of primary sources. These users supply the data in the data ecosystem, and are given the right to generate access tokens for their data in the form of data tokens. The term generate here is to be understand broadly as allowing for mining data tokens upon request and fulfilling conditions given, e.g. by the source token. The data tokens may be generated by an intermediary, e.g. a (decentralized) smart contract. Data token holders are users who may ultimately want to access proprietary data that requires a data token to access. Data token holders can choose to mint their data tokens. Minting data tokens may be associated with an existing source token, because all data tokens represent access to an existing data set owned by (associated with) a particular source token. FIG. 7 shows an exemplary embodiment of the data access management system 770, which may be based on blockchain. The data access management system 770 comprises a computer system comprising a plurality of computer devices connected to a network. Such a computer system may include, for example, two or more nodes which are participating on the blockchain, e.g. hold its at least partial copy and may record transactions onto the blockchain. In other words, the computer system may be a distributed system. A computer device is any kind of a device with some computation power, such as a computer or a processor or another piece of hardware, which may include specific or programmable hardware and/or general or special purpose processor(s) or a combination of a plurality of different hardware devices.

For example, the computer system includes a non-fungible token (NFT) registry 740 storing on a blockchain: (i) source NFTs, each source NFT (sNFT) being uniquely associated with a data source, and (ii) data NFTs, each data NFT (dNFT) being attributed to one sNFT and granting access to the associated data source.

The NFT registry 740 may correspond to the distributed storage of the blockchain on the nodes (such as the computer devices) recording the sNFTs and the dNFTs. Thus, in FIG. 7, the block corresponding to the NFT registry 740 is functional. Structurally, the NFT registry 740 comprises portions of storage from two or more computer devices participating on (forming) the blockchain system 770. It is noted that the sNFTs and dNFTs may both be stored on the same blockchain such as a public blockchain, e.g. the Mainnet Ethereum. However, it is conceivable to store the sNFTs and the dNFTs on respectively different blockchains.

At least one of the computer devices is configured as an sNFT registry service 750 capable of verifying a data source, minting an sNFT in association with the authenticated data source, and registering the minted sNFT to the blockchain. In other words, one or more computer devices may be capable of verifying the data source. The verification may include a specific centralized verification 730 as mentioned above with reference to Genesis. The verification may include checking a white list which may be stored on the blockchain or elsewhere available and which may include data sources authorized to mint sNFTs. Thus, in some implementations, the sNFT registry service may be distributed and deployed as one or more computer device which centrally verifies the data source and mints a token for that data source and/or one or more devices which enable to whitelisted users to mint the sNFTs themselves, via a contract. It is noted that when referring herein to "centralized verification" or "centralized authority", it does not mean that the verification or the authority cannot be distributed in terms of the underlying computer system. What is meant is that the verification and sNFT provision is performed in a permissioned manner, e.g. by a selected one or more data access management platform managers.

The registering may include entering the transaction corresponding to the sNFT minting into a transaction pool from which the blockchain node(s) may select the transaction and include it into a block and record the block on the blockchain as briefly described in the background section above.

At least one of the computer devices is configured as a dNFT registry service 760 capable of (i) receiving a request for dNFT from a data user for an access right to the data source, and (ii) minting a dNFT for the requested access right and registering the minted dNFT as attributed to the sNFT which is associated with said source data and with said data user to the blockchain. It is noted that the computer device(s) configured as the dNFT registry service 760 may be the same or may differ from the computer device configured to as the sNFT registry service 750. The dNFT registry service 760 and/or the sNFT registry service 750 may be implemented as a smart contract on the same blockchain as the dNFT registry and dNFT registry, respectively. Data may be any kind of data such as finance data, results of measurements, control data, media, or the like. The data may be even more generally understood as data which is publicly available (and accessible) and access to the data may correspond to actually allowing the usage of the data, i.e. to the license to use the data to the extend defined by the dNFT.

In some exemplary implementations (e.g. the ART implementation mentioned above), each sNFT is capable of being attributed one or more dNFTs and includes access terms for the source data; and/or each dNFT is capable of being attributed to a single one sNFT. However, it is noted that different architectures may also be possible. For instance the sNFT in some embodiments does not necessarily include the license terms and may merely include a reference to license terms or the license terms may be implicit or default so that no explicit reference to the terms is necessary. It is also conceivable to design a dNFT referring to more than one sNFT, although having a single sNFT may provide for a simpler traceability. There may be some sNFTs for example for outlier cleaning in the underlying (parent) data source(s), which may result in a higher data quality. Meta sNTFs may enable accessing processed, e.g. filtered, data. By way of the token hierarchy described above, still the origin of the data and the kind of processing may be reliably tracked. or example, said data source is based on one or more other data sources and said sNFT is a meta sNFT associated with one or more parent sNFTs that are respectively associated with said one or more other data sources. This feature may enable maintaining the rule that one dNFT is attributed to only one sNFT while still providing the possibility of tracking back multiple sources possibly with different data access conditions.

According to an exemplary implementation at least one of the computer devices of the system 770 is configured as a data access control service 780 capable of controlling the data access based on the dNFTs. In particular, the data access control service 780 (or shortly data access service) may be capable of (and configured for) receiving a request for accessing the source data and the dNFT attributed to the sNFT which is associated with said source data. The request does not have to be separate from the dNFT; provision of a dNFT to the data access control service 780 may imply request for accessing the corresponding data source. The data access control service 780 may be implemented in an automated manner as a smart contract, preprogrammed and running on the top of the blockchain system 770. The data access control service 780 may be further capable of verifying authenticity of the dNFT and/or checking whether the access right specified by the dNFT is applicable to access the data source. Based on the results of the verification and checking, the data access control service 780 may control the access to the data. The control may include permitting an access to the data source if the verification and checking was affirmative and denying the access to the data source if the verification or checking (or both) was negative. For example, if the dNFT is not registered on the blockchain or not registered to the requesting data user or not registered for the accessed data the verification will be negative. For example, if the dNFT does not allow access to the data at the current time instant or does not allow the type of access requested (e.g. access for commercial purposes) or the like, then the checking will be negative. The present disclosure is not limited to the above exemplified conditions verified or access rights checked. They are not necessary either. The respective verification conditions and access rights checked may be configured (e.g. by correspondingly programing the data access control service 780) specifically and differently for specific applications of the data access management system 770. The automated data access control 780 based on a smart contract may provide a transparent and automated data access control.

In some exemplary implementation the data access control service 780 further stores a history of the data access. For example, the data access control service 780 may capture each data access using the same dNFT as a transaction on the blockchain. Each data access may be associated with a reward to the attributed data sources (data source pools). However, the this is only an example and the present disclosure is not limited to such example. In alternative implementations or in addition, the amount of data accesses allowed by the dNFT may be part of the access rights embedded in or associated with the dNFT. In some implementations, each data access requires a dNFT. In some implementations, with one dNFT the amount of data accesses is unlimited (although, e.g. the time period of access to the data or the like may still be limited). As is clear to those skilled in the art, with the present data access management and control architecture, the data access can be configured in various ways not departing from the present disclosure. It is also understood that the data access control may be implemented on the same blockchain or on a blockchain different from the blockchain for minting sNFTs and dNFTs. They may be parts of the blockchain system 770.

According to an embodiment, data of said data source is stored on the blockchain and the data access control service is a pre-programed contract on the blockchain. Storing the data on the blockchain may be performed, for instance by employing an oracle for importing an external data to the blockchain. Storing the data on the blockchain may further increase the transparence and efficiency of the data access and data access management system, e.g. by simplifying the verification and the like. However, as mentioned above, the present disclosure is not limited to storing the data on the blockchain. For larger amounts of data, it may be advantageous to store them off-chain and to provide, by way of the dNFT merely a link or a key to access the data off-chain.

Figure 8:
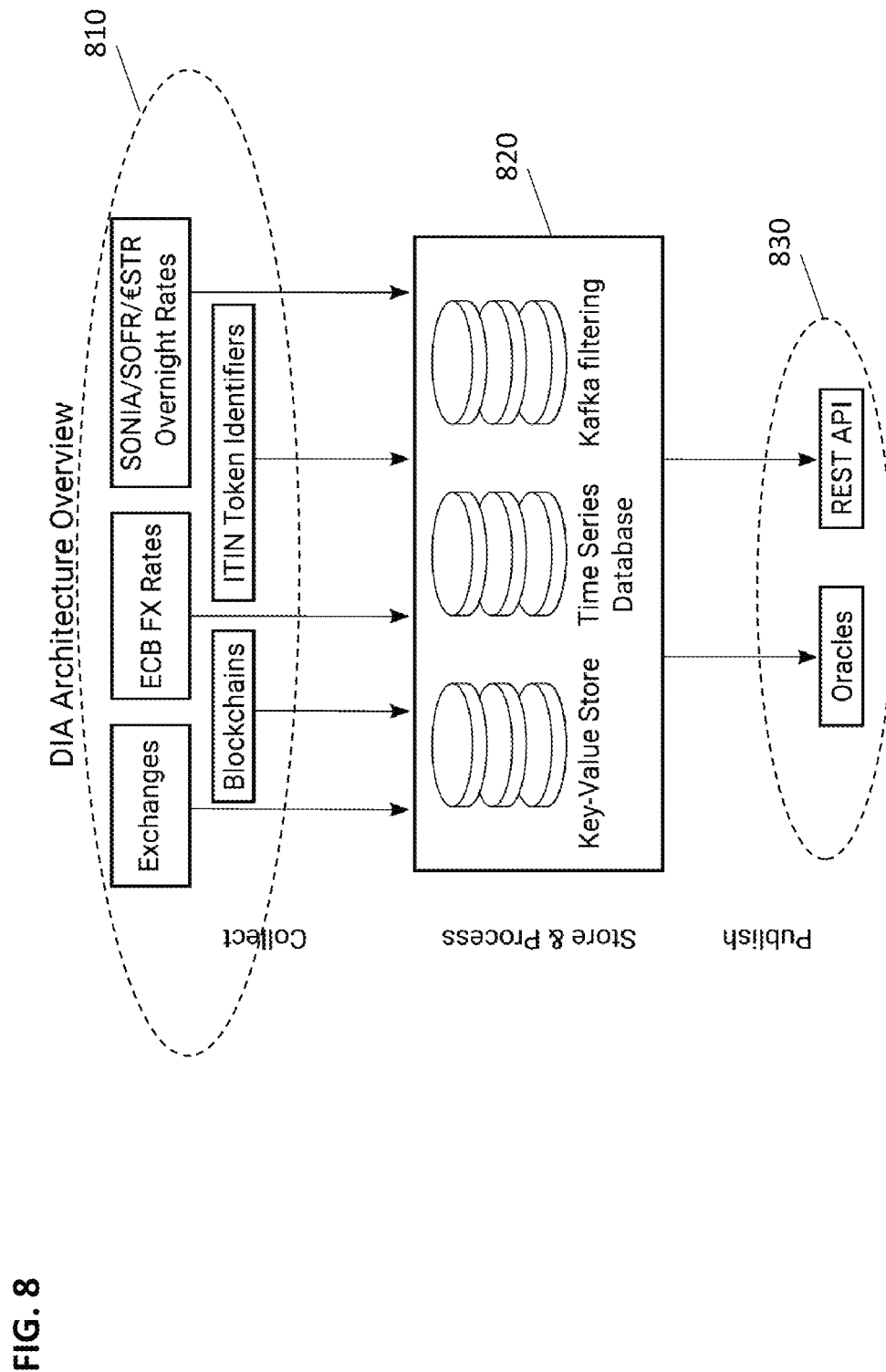
FIG. 8 is a block diagram illustrating data provision system that may provide data managed by the data access management system

FIG. 8 shows an exemplary use case for data access management and data access control described herein. In particular, the data in this use case may be obtained in three main building blocks. First, a data collection module 810 and sources data from various data sources. Second, a flexible data issuing module 820 handles different kinds of data streams, such as streams from high frequency trading APIs to data that is possibly never changed. Thirdly, the collected and aggregated data is sourced and distributed using a data distribution module 830.

The data collection module 810 is a functional module which may be implemented, e.g. as a scraper program running on the blockchain system 770 or externally to it. In FIG. 8, the scraper uses various sources to obtain data relevant for DeFi. For example, it may scrap (collect) data from some exchanges (real-world or crypto-based or mixed), blockchains, some overnight reference rates (e.g. SOFR, SONIA, etc) from the relevant web sites, ITIN token identifiers, European Central Bank (ECB) or other authority's financing rates, or the like.

The data issuing module 820 uses the scrapped data from the different sources to generate (issue) own data, e.g. the data issuing module 820 may be understood as a data source described above. In the example of FIG. 8, the data issuing module 820 may process the scrapped data wherein the processing may include Kafka filtering. Kafka stores key-value messages that come from arbitrarily many sources called producers. The data can be partitioned into different partitions within different topics. Within a partition, messages are ordered by their offsets (the position of a message within a partition), indexed and stored together with a timestamp. Other processes called data consumers can read messages from the partitions. However, the present disclosure may work with different data sourcing and filtering mechanisms and Kafka is only an exemplary possible building block.

The data distribution module 830 may include, for example, an API (application programing interface) for enabling access to the data sourced by the data issuing module. In addition or alternatively, the data distribution module may include an oracle system for transferring the sourced data to the blockchain. As discussed above, the data may be accessible via blockchain and/or off-blockchain. The sourcing of the data by the data issuing module 820 may include minting a (meta) sNFT which is parented by sNFTs of the scrapped sources. The accessing of the data over the API or the blockchain may be conditioned by minting a corresponding dNFT as described above.

The transferring of the data onto the blockchain may be performed regularly, e.g. every predefined amount of time such as one minute or every two minutes or every hour or every day or the like, depending on the type of the data regarding their changeability. In some applications including slowly changing data, the transferring of the data into the blockchain may be performed on an event-triggered basis, e.g. upon data update. Combinations of both approaches are possible. The above use case is only one of possible use cases of the data access management system described by the present disclosure. It regards data for finance applications. Some exemplary use cases may include media data such as audio data or multimedia data. Some exemplary use cases may include measurement data such as weather data, e.g. wind speed, temperature, humidity or the like or other sensor data. Some exemplary use cases may include control data or instructions for controlling or training machines. As is clear to those skilled in the art, the present disclosure may be applied to access or license and track usage of any type of data, which may be also intellectual or industrial rights. For example, an sNFT may be issued for an underlying intellectual or industrial right and dNFT may be understood as a license for such intellectual or industrial right. As described above, according to some embodiments, NFTs may be featured for digital rights management and may be contained in two contracts:

- Source NFTs that are held by data owners (data sources) and are used to control the licensing of data to possible data users (e.g. API data users such as contracts further using the data), and
- Data NFTs that are minted by the data users. They may be required to transfer a reward for the minting and may participate by claiming future rewards from the minting pool.

According to a specific and exemplary implementation, source NFTs may hold a structure with information on the number of minted tokens (dNFTs), their ranking owners, the last claim a rank was claimed, if a rank already exists, and the connected source NFT ID, if any. Such structure is exemplified below:

```
struct dataNftCategory {
    uint numMintedNfts;
    mapping (uint => address) rankOwner;
    mapping (uint => uint) lastClaimPayout;
    bool exists;
    uint sourceNftId;
}
```

In the structure, uint stands for unsigned integer and bool stands for a Boolean variable type. A mapping stands for a key-value-store. The variable numMintedNfts stores the number of minted dNFTs, the Boolean variable specifies whether or not a category already exists (i.e., was created by a sNFT holder), and the variable sourceNftId specifies the related (parent) one or more sNFTs. The key-value-store rankOwner stores the owner addresses of each minted rank. LastClaimPayout holds for each rank the number of minted tokens at the time of the last time the rank's payout was claimed. The structure is specific for the data category dataNftCategory, which may be e.g. data source such as a particular exchange rate from a particular provider or the like.

According to an embodiment, the data access management system's dNFT registry service is further capable of minting said dNFT for a requested access right upon fulfilling a pre-configured condition including at least one of:
- transfer of an amount of a crypto-currency to an sNFT pool including the sNFT to which the dNFT is attributed and/or one or more parent sNFT of said sNFT;
- transfer of an amount of a crypto-currency to a pool of dNFTs attributed to said sNFT; and
- burning an amount of a crypto-currency.

The requested access right may be an input to the dNFT contract and may include, e.g. the type of the access and/or the time period for the data access, or the like.

All relevant addresses for burning and distributing the reward token(s) (e.g. currency token(s)) may be stored in the contract and in setting a constructor. The owner can update them individually. For example, the following may be stored in the contract to configure the execution of the contract underlying an dNFT:

```
address public paymentToken;
address public burnAddress;
uint burnAmount;
uint mintingPoolAmount;
uint sourcePoolAmount;
```

Herein, the paymentToken is an address (public address) for sending a reward, burnAddress is an address (public address) for burning some amount of currency tokens, burnAmount is an amount of currency tokens to be burned, mintingPoolAmount is an amount of reward or currency tokens for the dNFT minting pool and sourcePoolAmount is an amount of reward or currency tokens for the sNFT pool.

New categories can be created by the owner of the data (or, as mentioned above e.g. in the Genesis period, by some centralized authority) by applying, e.g., the following exemplary creator function generateDataNftCategory:

```
function generateDataNftCategory (uint dataCategoryId, uint sourceNftId) public onlyOwner {
    dataNftCategories[dataCategoryId].exists = true;
    dataNftCategories[dataCategoryId].sourceNftId = sourceNftId;
}
```

Input to the exemplary function is an ID dataCategoryId of the new data category and an ID sourceNftId of an sNFT for the data category.

As mentioned above, each dNFT may be associated with a rank that influences determination of an amount of reward (e.g. crypto-currency) pertaining to said dNFT from said dNFT pool. Reward may be in crypto-currency, but this is not to limit the present disclosure. In general, it is possible to provide reward in a different kind of tokens or assets, including NFTs or other token types. For example, the rank is determined in a pseudo-random manner for at least a subset of firstly minted dNFTs among all minted dNFTs.

Minting of the data NFTs (dNFTs) may be performed by first checking if the category already exists and then checking if a (pseudo)randomization needs to be conducted, e.g. in case the rank is one of the first ten. After that, some reward tokens (as defined by the NFT contract, see the example above) are transferred to the burn address, the source (sNFT) pool and the minting (dNFT) pool. The NFT is minted and the relevant category data structure content is updated to reflect this minting, e.g. by the following exemplary function mintDataNft:

```
function mintDataNft (uint dataCategoryId) public {
    // Check that categoryId exists
    uint currNftCategory = dataNftCategories [dataCategoryId];
    if (!currNftCategory.exists) { throw; }
    // Get current number minted of the Nft
    numMinted = currNftCategory.numMintedNfts;
    newRank = numMinted;
    // Check for randomization (<10) and get unfilled rank
    if (numMinted < NUM_PRIVILEGED_RANKS) {
        newRank = randomInt(NUM_PRIVILEGED_RANKS);
        while (currNftCategory.rankOwner[newRank] != 0) {
            newRank = (newRank + 1) % NUM_PRIVILEGED_RANKS;
        }
    }
}
```

```
// Transfer reward token to burn address
ERC20(paymentToken).transferFrom(msg.sender, burnaddress,
burnAmount);
// Transfer payment token to minting pool
ERC20(paymentToken).transferFrom(msg.sender, mintingPool,
mintingPoolAmount);
// Transfer payment token to source Nft pool
ERC20(paymentToken).transferFrom(msg.sender, sourcePool,
sourcePoolAmount);
// Mint data Nft
_mint(msg.sender, dataCategoryId, 1, " ");
// Update data struct
dataNftCategories[dataCategoryId].rankOwner[newRank] = msg.sender;
dataNftCategories[dataCategoryId].numMintedNfts = numMinted++;
}
```

In the above example code, the command throw throws an exception and thus ends the execution of the function. Symbol "!" stands for logical negation, "%" stands for modulo, "++" stands for incrementing by one, and "II" indicates that the line is a comment line. Function mint mints has as arguments the data user, the data category (corresponding to the sNFT, number of tokens to be minted (here set to 1), and an empty unused parameter. The number of tokens and the unused parameter are included here, but are not necessary and do not need to be included. Constant NUM_PRIVILEGED_RANKS is the number of privileged ranks. In the present example it is 9 (representing 10 ranks). The function randomInt returns a random integer from the range 0 (included) to its argument (here NUM_PRIVILEGED_RANKS). The above function maybe provided by the contract and thus may configure one or more of the computer devices in the data access management system to implement the minting.

For calculating the claim amounts, the rank and the last time (measured in numbers of minted tokens) may be considered. The actual amounts depend on the chosen distribution. Source NFTs may have one or more parent source NFTs. In case a source NFT has multiple parents, its source rewards may be split evenly between all parents. A source NFT may also track how many data NFTs were minted referencing is. For example, an admin address admin (e.g. a predefined address) can perform certain administrative actions on the source NFT, as well as claiming rewards for the NFT. A structure for the meta data related to an sNFT may be as follows:

```
struct sourceNftMetadata {
    uint numDataTokens;
    bool exists;
    address admin;
    uint lastClaim;
    uint [ ] parentIds;
}
```

The structure may be embedded in the sNFT or stored separately on blockchain. The number of minted tokens is stored in numDataTokens. The variable exists defined whether or not the specified sNFT exists. Variable type uint[ ] indicates an array of unsigned integers: there may be 0, one or more parent sNFTs.

The initial parent parentId can be added in the constructor to the sNFT sourceNftId or later on by the source NFT administrator by using e.g. the following function addParentId.

```
function addParentId(uint sourceNftId, uint parentId) public {
    require(sourceNfts [sourceNftId].admin == msg.sender);
    sourceNfts [sourceNftId].parentIds.push(parentId);
}
```

Function require reverts (fails) in case the condition in its argument is not true. As mentioned above, in some embodiment, the contract owner of data can generate new source NFTs over a central authority, such as admin in the following example:

```
function generatesourceToken(uint sourceNftId) public onlyOwner {
    sourceNfts[sourceNftId].exists = true;
    sourceNfts[sourceNftId].admin = msg.sender;
}
```

The above mentioned structures and the corresponding functions may be embedded on the blockchain an thus, configure the data access management system (one or more computer devices including in the system) to operate as the sNFT and/or dNFT registry service. The above structures and functions are merely exemplary and in no way to limit the present disclosure. However, they provide an efficient and transparent possibility, which may be readily implemented to manage data access on the blockchain system 770.

In some exemplary implementation, non-fungible tokens obey the ERC-721 standard. However, the present disclosure is not limited to non-fungible tokens following the ERC-721, nor to Ethereum or Ethereum compatible blockchains or to any particular blockchain. Ethereum is discussed herein for exemplary purpose and, although the present disclosure is readily applicable to Ethereum based blockchain, the functions and system features are general and can operate on any blockchain platform.

Figure 9:
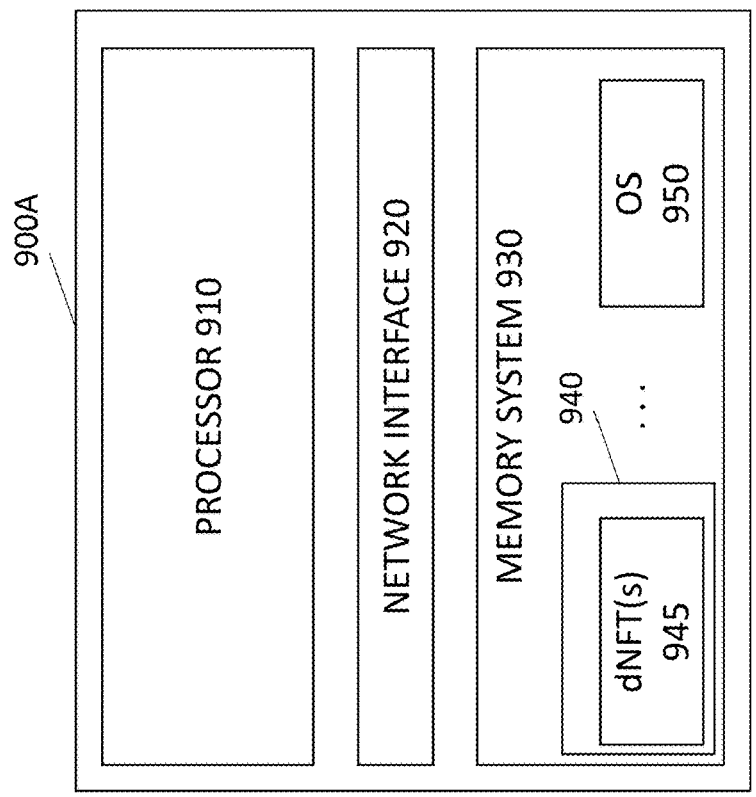
FIG. 9 is a block diagram illustrating an exemplary structure of a data source device.

As described above, the data sources may mint and hold sNFTs and data users may mint and hold dNFTs. A corresponding exemplary data user user device is illustrated in FIG. 9, while a corresponding exemplary data source user device is illustrated in FIG. 10.

For example, a user device 900A for a data user may comprise processing circuitry 910, a network interface 920, and a memory system 930. The processing circuitry may include one or more special or general-purpose processors and/or programmable hardware and/or dedicated hardware. The processing circuitry may be also referred to as a processor. The network interface may include e.g. TCP/IP processing and the underlying layers, depending on the medium via which the user device is connected to the network (such as wireless, cable, satellite, or the like). The memory system 930 may be any volatile and/or non-volatile storage medium such as a computer readable and non-transitory medium.

The memory system 930 contains an application 940 and the processor 910 is capable of being configured by the application 940 to store one or more non-fungible token (NFT) 945 for data (dNFT), wherein the one or more dNFTs 945 is registered on a blockchain (e.g. using the blockchain system 770), attributed to one source NFT (sNFT), and granting access to a data source, wherein the sNFT is uniquely associated with the data source. The processor 910 may be further configured by the application 940 to generate a request for access to data from said data source and transmitting the request accompanied with the dNFT over the network interface 920. The application may be, for instance a wallet application installed on the user device. As mentioned above, each sNFT may be capable of being attributed one or more dNFTs and includes access terms for the source data. Each dNFT may be capable of being attributed to a single one sNFT. Apart from the application 940, the memory system 930 may store an operation system (OS) 950 and further programs. The application 930 may further enable receiving, transmitting, and storing reward tokens.

Figure 10:
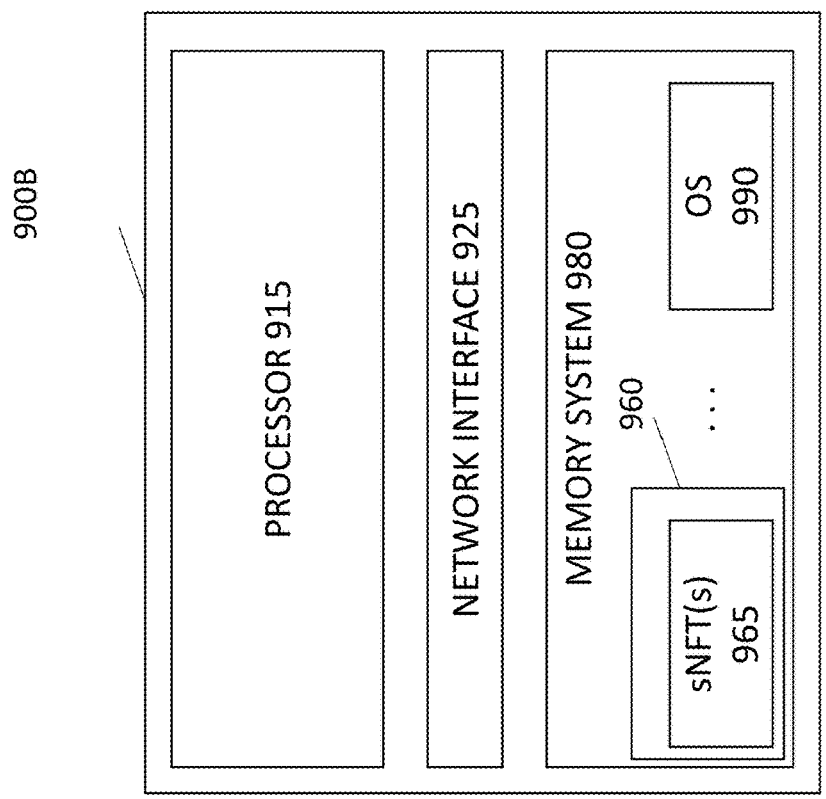
FIG. 10 is a block diagram illustrating an exemplary structure of a data user device.

FIG. 10 shows a block diagram of an exemplary (user) device 900B for a data source. The user device 900B may comprise processing circuitry 915, a network interface 925, and a memory system 980. The processing circuitry 915 may include one or more special or general-purpose processors and/or programmable hardware and/or dedicated hardware, similarly as for the user device 900A. The processing circuitry 915 may be also referred to as a processor. The network interface 925, similarly to the network interface 920 of the user device 900A, may include e.g. TCP/IP processing and the underlying layers, depending on the medium via which the user device is connected to the network (such as wireless, cable, satellite, or the like). The memory system 980 may be any volatile and/or non-volatile storage medium such as a computer readable and non-transitory medium.

The memory system 980 contains an application 960 and the processor 915 is capable of being configured by the application 960 to store one or more non-fungible tokens (NFTs) 965 for data source (sNFT), wherein the one or more sNFTs 965 is registered on a blockchain (e.g. using the blockchain system 770) in association with a data source. In particular, the sNFT is uniquely associated with the data source. The processor 915 may be further configured by the application 960 to generate a request for an sNFT over the network interface 925. The application 960 may be, for instance a wallet application installed on the device 900B. Apart from the application 960, the memory system 980 may store an operation system (OS) 990 and further programs. The application 960 may further enable receiving, transmitting, and storing reward tokens.

Users or data sources may use the application 930, 960 as a digital wallet or as a browser plug-in via one or both of which the user or data source may request the desired NFT.

Figure 11:
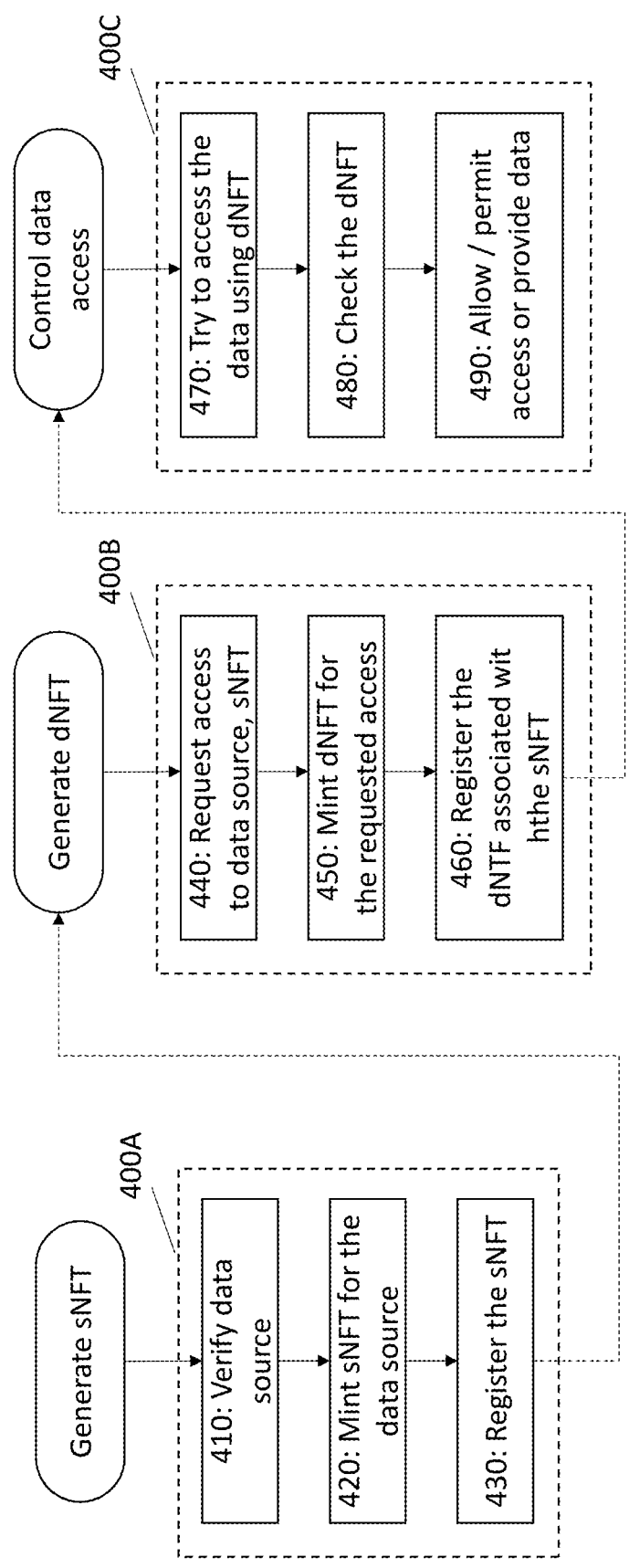
FIG. 11 is a flow diagram illustrating an exemplary method for managing data access according to an embodiment.

FIG. 11 shows an exemplary method for data access management. The method may be divided into three methods: sNFT generating 400A, dNFT generating 400B, and data access control based on the dNFT 400C. These methods correspond to the functionality of the data access management system described above. Thus, the details are not repeated herein as they are equally applicable for the present methods.

The generating 400A of a source Non-Fungible Token (sNFT) includes the following steps: verifying 410 a data source, minting 420 an sNFT in association with the authenticated data source, and registering 430 the minted sNFT to the blockchain. The verification 410 includes for instance the above described verification by the centralized authority (e.g. administrator of the system) or checking of permission for minting a source token in a permissioned system. It is conceivable to make source minting permissionless in which case this step and the corresponding functionality in the data access management system is not necessary and can be disposed of. Nevertheless, in some systems it may be advantageous to maintain the verification as it may provide for a more transparent and reliable data source identification and thus to more reliable data.

The minting 420 is performed, e.g. by the data source providing input (source data identification and possibly some access terms for addressing the source data or the like) to a contract on a blockchain, which may then automatically return the sNFT to the requesting data source. The requesting may be performed via an API, which may feature a graphic user interface, depending on implementation or a particular deployment scenario. In some implementations, as mentioned above, the minting of sNFTs may be performed by an administrator (or central authority) of the data access management system. The sNFTs are then transferred to the data source. The registering 430 of the minted token on the blockchain may be performed as a part of the blockchain functionality related to registration of the transactions described above. It is noted that the data source may, but does not have to be a node of the blockchain system. The same applied for the data users. One or more data users may be contracts on the blockchain.

In terms of the corresponding data source user method, the data source mints a token by requesting an issuance of an sNFT for a data set, providing the prescribed reward to the respective one or more entities (e.g. pools), and obtaining the sNFT. The data source device may store the obtained sNFT in a memory (960) which may be accessible via a wallet application when the application is run on a computing device.

The generating 400B of a data Non-Fungible Token (dNFT) includes the following steps: receiving 440 (e.g. by a corresponding contract over a network interface) a request for dNFT from a data user for an access right to the data source, minting 450 (by the data user) a dNFT for the requested access right (e.g. including providing the corresponding reward to the respective prescribed one or more entities such as pools or, in general, account addresses), and registering 460 the minted dNFT as attributed to the sNFT which is associated with said source data and with said data user to the blockchain. Once there are some sNTFs, dNTFs attributed to an sNTF may be minted. This is indicated in FIG. 11 by way of a dashed line. The generation 400A of sNTFs does not have to be followed by minting of dNTFs in general. It is noted that the data users may also be nodes to the blockchain system, but need not to be.

The data access control 400C based on the dNFT includes the following steps: request 470 accessing the data source, verifying (checking) 480 the corresponding dNFT, and controlling 490 the access by allowing or permitting the access based on the dNFT.

In these methods, said sNFT is one of a plurality of sNFTs registered on the blockchain and each sNFT is uniquely associated with a data source. Moreover, said dNFT is one of a plurality of dNFTs registered in the blockchain and each dNFT is attributed to one sNFT and capable of granting access to the associated data source. The methods may include steps and further limitations as described above for the functionality of the corresponding system.

According to an aspect of the present disclosure, a computer readable and non transitory medium is provided, storing a program which, when run on one or more processors, causes the one or more processors to perform the steps of any of the above mentioned methods.

Summarizing, the present disclosure relates to data access management and the relates data access management system, user devices for data users and data sources, as well as to the corresponding methods. In some embodiments, a non-fungible token (NFT) registry is provided as a part of the data access management system, storing on a blockchain: source NFTs, each source NFT (sNFT) being uniquely associated with a data source; and data NFTs, each data NFT (dNFT) being attributed to one sNFT and granting access to the associated data source. The data sources may mint or request minting of the sNFT and the data users may mint dNFTs.

The present disclosure may provide some advantages, e.g. white list for embedded (permitted) data sources, immutable and smart contract enabled renewal, cancellation and amendment of license, an immutable license text and rights embedded in NFT token.

The embodiments and exemplary implementations mentioned above show some non-limiting examples. It is understood that various modifications may be made without departing from the claimed subject matter. For example, modifications may be made to adapt the examples to new systems and scenarios without departing from the central concept described herein.

We claim:

1. A data access management system, comprising:
a computer system comprising a plurality of computer devices connected to a network,
wherein the computer system comprises:
a non-fungible token (NFT) registry;
a source NFT (sNFT) registry service comprising at least one of the computing devices;
a data NFT (dNFT) registry service comprising at least one of the computing devices;
at least one data user comprising at least one of the computing devices; and
at least one data source comprising at least one of the computing devices;
wherein the NFT registry stores on a blockchain:
sNFTs, each sNFT being uniquely associated with a data source of the at least one data source; and
dNFTs, each dNFT being attributed to one sNFT and granting access to the associated data source;
wherein the sNFT registry service is capable of:
verifying a data source, minting an sNFT in association with the authenticated data source, and registering the minted sNFT to the blockchain, and
wherein the dNFT registry service is capable of:
receiving a request for a dNFT from a data user of the at least one data user for an access right to the data source; and
minting the dNFT for the requested access right and registering the minted dNFT as attributed to the sNFT which is associated with said data source and with said data user to the blockchain.

2. The data access management system according to claim 1, wherein:
each sNFT is capable of being attributed one or more dNFTs and includes access terms for source data of the data source; and
each dNFT is capable of being attributed to a single one sNFT.

3. The data access management platform according to claim 1, wherein said data source is based on one or more other data sources and said sNFT is a meta sNFT associated with one or more parent sNFTs that are respectively associated with said one or more other data sources.

4. The data access management system according to claim 1, wherein at least one of the computer devices is configured as a data access service capable of:
receiving a request for source data of the data source and the dNFT attributed to the sNFT which is associated with said source data;
verifying authenticity of the dNFT;
checking whether the access right specified by the dNFT is applicable to access the data source; and
permitting an access to the data source if the checking was affirmative and denying the access to the data source if the checking was negative.

5. The data access management system according to claim 4, wherein data of said data source is stored on the blockchain and the data access service is a pre-programed contract.

6. The data access management system according to claim 1, wherein the dNFT registry service is further capable of minting said dNFT for a requested access right upon fulfilling a pre-configured condition including at least one of:
transfer of an amount of a crypto-currency to an sNFT pool including the sNFT to which the dNFT is attributed and/or one or more parent sNFT of said sNFT;
transfer of an amount of a crypto-currency to a pool of dNFTs attributed to said sNFT; or
burning an amount of a crypto-currency.

7. The data access management platform according to claim 6, wherein each dNFT is associated with a rank that influences determination of an amount of crypto-currency pertaining to said dNFT from said dNFT pool.

8. The data access management platform according to claim 7, wherein the rank is determined in a pseudo-random manner for at least a subset of firstly minted dNFTs among all minted dNFTs.

9. A user device comprising:
a processor;
a network interface; and
a memory containing an application;
wherein the processor is capable of being configured by the application to:
store one or more data non-fungible tokens (dNFTs), wherein the one or more dNFTs is registered on a blockchain by a dNFT registry service as attributed to one source non-fungible token (sNFT) which is associated with a data source, the one or more dNFTs granting access to the data source, wherein the sNFT is uniquely associated with the data source by an sNFT registry service that verified the data source, wherein a non-fungible token (NFT) registry stores the sNFT and the one or more dNFTs on the blockchain; and
generate a request for access to source data from said data source and transmit the request accompanied with the dNFT over the network interface.

10. The data access management system according to claim 9, wherein
each sNFT is capable of being attributed one or more dNFTs and includes access terms for the source data; and
each dNFT is capable of being attributed to a single one sNFT.

11. A data access management method, comprising:
generating, with a source non-fungible token (sNFT) registry service, an sNFT, wherein
generating the sNFT includes:
verifying a data source,
minting an sNFT in association with the authenticated data source, and
registering the minted sNFT to a blockchain,
generating, with a data non-fungible token (dNFT) registry service, a dNFT, wherein
generating the dNFT includes:
receiving a request for a dNFT from a data user for an access right to the data source,
minting the dNFT for the requested access right, and registering the minted dNFT as attributed to the sNFT which is associated with said data source and with said data user to the blockchain, wherein said sNFT is one of a plurality of sNFTs registered on the blockchain and each sNFT is uniquely associated with a data source, and wherein said dNFT is one of a plurality of dNFTs registered in the blockchain and each dNFT is attributed to one sNFT and capable of granting access to the associated data source, wherein a non-fungible token (NFT) registry stores the plurality of sNFTs and the plurality of dNFTs on the blockchain.

\* \* \* \* \*

UNITED STATES PATENT AND TRADEMARK OFFICE
CERTIFICATE OF CORRECTION

| | |
|---|---|
| PATENT NO. | : 11,636,469 B2 |
| APPLICATION NO. | : 17/341869 |
| DATED | : April 25, 2023 |
| INVENTOR(S) | : Michael Weber et al. |

It is certified that error appears in the above-identified patent and that said Letters Patent is hereby corrected as shown below:

In the Claims

Column 21, Line 54, Claim 3, delete "platform" and insert -- system --

Column 22, Line 19, Claim 7, delete "platform" and insert -- system --

Column 22, Line 23, Claim 8, delete "platform" and insert -- system --

Signed and Sealed this
First Day of August, 2023

Katherine Kelly Vidal
*Director of the United States Patent and Trademark Office*